(12) United States Patent
Barcheña

(10) Patent No.: US 6,528,009 B1
(45) Date of Patent: Mar. 4, 2003

(54) SOLID PRODUCT MANUFACTURED FROM RECYCLED DOMICILIARY SWEEPINGS MATERIALS, A PROCEDURE FOR MANUFACTURING SAID PRODUCT, AND A MOBILE EQUIPMENT FOR RECYCLING PLASTIC

(76) Inventor: Juan Carlos Barcheña, Calle 12 n°1397 Las Parejas 2505, - PCIA, Santa Fe (AR)

( * ) Notice: Subject to any disclaimer, the term of this patent is extended or adjusted under 35 U.S.C. 154(b) by 0 days.

(21) Appl. No.: 09/666,637

(22) Filed: Sep. 21, 2000

(30) Foreign Application Priority Data

Sep. 21, 1999 (AR) .......................................... 990104747

(51) Int. Cl.[7] .............................................. B29C 47/00
(52) U.S. Cl. .................. 264/920; 264/176.1; 264/177.1
(58) Field of Search ........................... 264/37.32, 176.1, 264/177.1, 299, 920, 918; 366/348

(56) References Cited

U.S. PATENT DOCUMENTS

| | | | | |
|---|---|---|---|---|
| 334,493 A | * | 1/1886 | Venema ........................ 106/224 |
| 4,682,699 A | * | 7/1987 | Ertley ............................ 211/75 |
| 5,009,511 A | * | 4/1991 | Sarko et al. ................. 210/673 |
| 5,176,861 A | * | 1/1993 | Ishikawa |
| 5,192,092 A | * | 3/1993 | DiBenedetto ................ 150/154 |
| 5,217,655 A | * | 6/1993 | Schmidt ...................... 264/131 |
| 5,225,137 A | * | 7/1993 | Sadr .............................. 241/23 |
| 5,240,656 A | * | 8/1993 | Scheeres ...................... 219/421 |
| 5,302,331 A | * | 4/1994 | Jenkins ..................... 106/15.05 |
| 5,407,624 A | * | 4/1995 | Engh, III et al. |
| 6,039,914 A | * | 3/2000 | Gehrke et al. ............... 264/118 |

* cited by examiner

Primary Examiner—Mark Eashoo
(74) Attorney, Agent, or Firm—Scully, Scott Murphy & Presser

(57) ABSTRACT

A product obtained from the use of sweeping materials, more particularly by means of recycling domiciliary sweepings. The product obtained by the present invention may be: posts, tables, rods, braces, moldings, cords, roadside ditches, boards or plates (like agglomerated wood) for the manufacture of all type of mouldable products such as, rods, sewers, posts, and any other product that can be made from a mouldable plastic-based material. It comprises of: a first component containing plastic polyethylene and polypropylene materials in a proportion that ranges between 25% and 30% of the final weight of the product; a second component of plastic PET type materials ranges between 30% and 40% of the total weight of the product; and a third component selected from: PVC, styrene, polyamides, polycarbonates, polystyrene, ABS, aluminum and cardboard. A procedure for obtaining a product from sweeping materials is also an object of the present invention, including the step of: separating from sweepings materials plastic materials found without classifying nor washing them; crushing this material in a blades mill; simultaneously warming up and extruding said material to a temperature of up to 300° C.

3 Claims, 3 Drawing Sheets

SOLID PRODUCT MANUFACTURED FROM RECYCLED DOMICILIARY SWEEPINGS MATERIALS, A PROCEDURE FOR MANUFACTURING SAID PRODUCT, AND A MOBILE EQUIPMENT FOR RECYCLING PLASTIC

FIELD OF THE INVENTION

The present invention is referred to an industrial product, as a light post, a lamina or plates for manufacturing several products such as furniture or the like, which is obtained from a plastic-based sweeping material, which is obtained from domiciliary sweepings recycled materials.

The present invention will also be referred to a procedure for obtaining this plastic-based recycled material, including novel and inventive stages, and through as a plastic-based material is obtained, for the manufacture of the above mentioned products.

The present invention also raises and in accessory form to the raised main object, transportable equipment that is especially useful to recycle plastic-based domiciliary sweepings, especially plastic trash habitually found in rubbish dumps such as plastic bottles of drinks, cleaning products, etc.

BACKGROUND OF THE INVENTION

It is already widely known that plastic-based sweeping materials usually take hundreds of years in degrading itself. The enormous population growth that the great urban centre underwent in the last decades has caused an exponential growth in the amount of sweeping materials, this is the reason why the environmental contamination has undergone a proportional increase to the previous phenomenon.

It is for that reason that industrialized countries of the world have developed and taken active recycling measures for treating sweepings materials, trying to convince to the population on the importance of recovering some materials such as glass, paper, plastics, etc., to avoid that some highly polluting products normally found in the sweepings materials become mixed with other organic sweeping materials that can be naturally recycled directly, by its fast normal decomposition.

Most of the habitually used plastic packages in the industry are made from non-degradable polymeric materials generating a high contamination level when they are disposed. At the present time, the practice has demonstrated that in spite of the efforts that the authorities of many countries make, and the campaigns that are made to manage the objective of recycling domiciliary sweepings, it was not still possible to manage an efficient separation of highly polluting domiciliary sweeping materials (as drink packages or cleaning products) from organic materials. For that reason there is still a need of trying to efficiently recycle those polluting sweeping materials so as to be able to stop or to try to restrain the contamination process said polluting materials generate.

Several industrial equipments are known in the market that uses sweeping materials as raw materials for manufacturing industrial products. For example, Argentine Patent Application Serial No. 334,493 published on Jul. $18^{th}$, 1997 may be mentioned. This application is referred to a method and equipment with which boards from recycled materials may be manufactured. In this case, raw material includes polyethylene, polypropylene, ABS, and some selected metals. Although this equipment presents some similarities in the sense of using plastic materials from domiciliary sweepings to make industrial products, as it is the case of a board of agglomerate, the same one is not a transportable and independent equipment, but it is a disposition that demands the construction of an industrial facility to carry out the method and to obtain the above cited industrial products thus obtained.

Another example corresponds to the Argentine Patent Application Serial No. P960103205 filed on Mar. $23^{rd}$, 1998 which is referred to a procedure to obtain castings from plastic sweeping materials. In this case, as in the previous cited patent application, the purposed equipment must be static and due to their physical and functional characteristics cannot be mounted in a trailer as it is the case of the present invention.

Their transportable charactertics turns to the purposed equipment into highly versatile equipment, since the same can be transported to different rubbish dumps where a task of plastic recovery can be carried out to feed the machine, without having to previously classify the type of plastic. This equipment approximately processes all type of plastics by raising the temperature of the extruder camera to a temperature of around 300° C. that assures the fusion of all type of plastics normally used for the manufacture of packages such as plastic bottles of soda waters, packages for cleaning products, etc.

Another prior art related with the present invention includes U.S. Pat. No. 5,302,331 of Jenkins referred to a waste treatment process for recycling household waste, garbage or trash into useful articles including in one preferred embodiment the steps of collecting the waste material, feeding the waste material into a pulverizer to convert the material to a powdery mass, adding water to the mass to form a slurry, adding a binder to the slurry to inhibit bacteriological growth, pouring or otherwise forming the slurry into a useful shape such as a block, or sheet, and allowing the formed shape to air dry under relatively low humidity. The resulting useful article may then be used as a building block, wallboard, ceiling tile and so on. In an alternative example, the binder is added directly to the pulverized waste material to produce a useful article such as a flexible roof shingle.

U.S. Pat. No. 5,244,220 of Cortez et. al. granted on Sep. 14, 1993 is referred to a portable recycling and work centre having a can crusher and multiple containers comprising plastic bags held under a shelf with an opening in the shelf over each bag. Tools and facilities for kitchen food preparation and household work are mounted thereon. The centre has a housing opening to the front side and the housing is convertible for use as a wheeled hand truck. A modular structure comprises a plurality of shelves mounted between parallel sides, and having a back and a floor.

U.S. Pat. Reg. No. 5,242,220 of Sandreth et al granted on Sep. 7, 1993 referred to a trash classification appliance for facilitating the sorting and handling of household trash as an aid to recycling such materials includes a housing with a plurality of vertically arrayed compartments containing horizontally disposed flexible bags with open ends extending through a separately covered access hole in each compartment front panel. Supporting slide mechanisms allow each compartment to be pulled out of the housing for unloading and alternate compartment configurations provide for the handling of waste newspaper or the inclusion of a trash compactor.

U.S. Pat. Reg. No. 5,192,092 of DiBenedetto et al granted on Mar. 9, 1993 referred to a recycling bin cart having a pair of wheels and rigid vertical support coupled to at least two horizontally supported shelves sized and spaced apart to receive recycling bins with the lower shelf being located close to the ground. The cart is used to transport recycling bins containing different segregated trash such as newspapers is used to reduce the lifting of the recycling bins for people who are physically impaired. The device may be folded when not in use in a collapsed position and also may be covered aesthetically for use in the home or apartment by a decorative covering while still being used for collecting individual segregated trash items.

U.S. Pat. No. 4,682,699 of Ertley et al granted on Jul. 28, 1987 referred to a waste recycling kit by which trash can be separated into its categories at its source, placed into standard size supermarket grocery bags and delivered to a collection point, such as at curb side, while in the bag for maintaining categorization of the trash until it reaches a recycling facility. The kit includes a wall mounted organizer in the form of a rack having a plurality of compartments shaped and configured to receive supermarket paper bags with indicia designating the category of trash to be placed in each bag. The bags may be removed from the compartments and placed in an exterior container which may be an in-ground container or a wheeled container that may be oriented at curb side so that a plurality of the bags may be placed in the container for pickup by personnel attending a pickup vehicle which is constructed to maintain the separated trash categorized until it delivers the trash to a recycling facility.

None of the above mentioned devices comply with the requirement of recycling plastic-based sweeping materials and manufacturing at the same time industrial products with this recycled material with a transportable unit.

The manufacture of a product is indeed one object of the present invention, which is obtained from a recycled plastic-based domiciliary sweepings materials. Thus, the present invention allows an efficiently management of polluting sweeping materials so that a new, useful industrial product may be manufactured at low costs, time-effective and environmentally friendly manner. Because the raw material with which the product hereby proposed is free (in fact, trash), the economic profile of the present invention is so much interesting since useful industrial products, like just mentioned, may be manufactured without having to count on the purchase of raw material that is normally an important cost in the final price of the product.

SUMMARY OF THE INVENTION

A product obtained from the use of sweeping materials is an object of the present invention, more particularly by means of recycling domiciliary sweepings. The product obtained by the present invention may be: posts, tables, rods, braces, moldings, cords, roadside ditches, boards or plates (like agglomerated wood) for the manufacture of all type of mouldable products such as, rods, sewers, posts, and any other product that can be made from a mouldable plastic-based material. In fact, without limiting the scope of protection of the present invention, it is possible to manufacture all type of products with the purposed material, since is an easily mouldable material, comprised of:

a first component containing plastic polyethylene and polypropylene materials in a proportion that ranges between 25% and 30% of the final weight of the product;

a second component of plastic PET type materials ranges between 30% and 40% of the total weight of the product;

and a third component selected from: PVC, styrene, polyamides, polycarbonates, polystyrene, ABS, aluminium and cardboard.

The previously cited materials are worn out and extradited with simultaneous heat contribution to obtain the fusion of the plastic materials during the extrusion, and its mixture to offer a mouldable homogeneous mass.

A procedure for obtaining a product from sweeping materials is also an object of the present invention, including the step of:

separating from sweepings materials plastic materials found without classifying nor washing them;

crushing this material in a blades mill;

simultaneously warming up and extruding said material to a temperature of up to 300° C.

It is also an object of the invention an equipment for eliminating from rubbish dumps these highly toxic sweeping materials, and to turn them into an economically useful product.

The present equipment makes possible to reuse those plastics. Basically, the purposed equipment consists of a chassis on which several equipment is mounted for processing said sweeping materials, in a completely independent way. That is, said chassis includes an own electricity-generating group, with two engines fed with oil gas. Said engines impel all the mechanisms involved in the process, water and fuel tanks, water pumps, cooling equipment and all the necessary to carry out the operation in a completely independent way.

The above is relevant considering that the physical place where the operation of this equipment is carried out (next to a rubbish dump) has none of the most elementary means to make an operation, such as water, electric power, gas, fuel, etc.

In summary we can mention that the product hereby proposed consists of a first component that contain plastic polyethylene materials and polypropylene materials of a proportion that ranges between 25% and 30% of the total weight of the product; a second component of PET type plastic materials ranges between 30% and 40% of the total weight of the product; and a third selected component of the group consisting of: PVC, styrene, polyamides, polycarbonates, polystyrene, ABS, aluminium and cardboard. Accessorily the invention proposes a procedure for the obtaining of the raw material for the manufacture of the above-cited product, including the stages of:

separating from sweepings materials plastic materials found without classifying nor washing them;

crushing this material in a blades mill;

heating and extruding the milled material at a temperature of around 300° C.;

pouring melted material in a mold;

cooling and taking off the product from the mold.

The present invention also proposes a transportable independent recycling equipment including a chassis mounted on wheels in which a belt conveyor is mounted that leads the material of non-classified plastic sweeping materials until a mill, which grinds this product and it later places it in a chain dump that transports the grinded product until a hopper. This hopper is a load hopper of a screw extruder which during its operation melt and kneads already worn out plastics, since it rises the temperature of the camera until 300° C., that is a temperature higher than the temperature to which these materials are normally melted.

Once processed by the extruder, the material becomes in semi-liquid state and is expelled by the extruder and falls within a mold which in agreement with its form produces an industrial product as is explained before. This mold full of hot melted material is later introduced within water coolant trays. Once cool, the product can be taken out from the mold ready to be used.

BRIEF DESCRIPTION OF DRAWINGS

The above cited are some of the relevant improvements purposed by the present invention, which will become apparent from the following specification. This specification should be interpretated with the attached drawings, as an exemplary and non limitative illustration of the invention, through which.

DETAILED DESCRIPTION OF THE INVENTION

Figure 1:
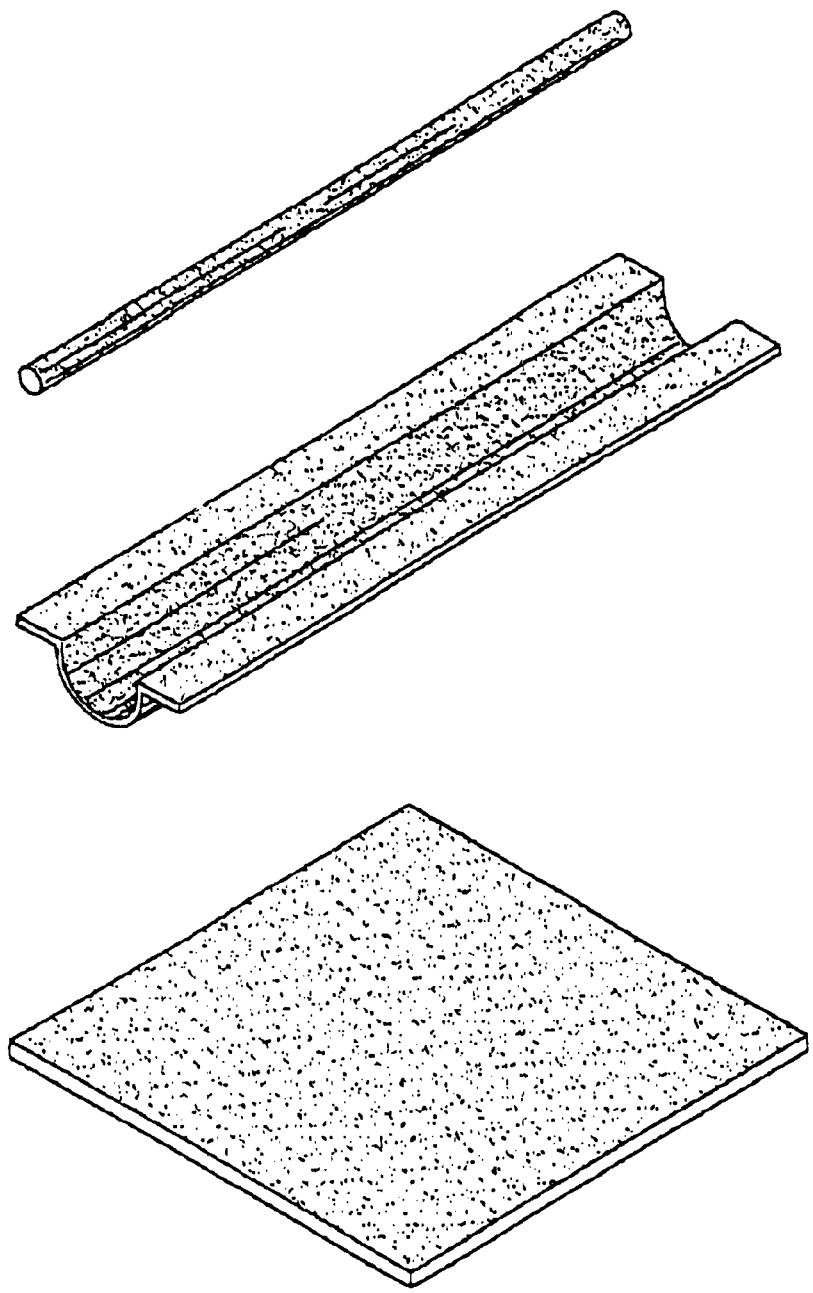
FIG. 1 is a general perspective view of a series of products obtained in agreement with the present invention.
Figure 2:
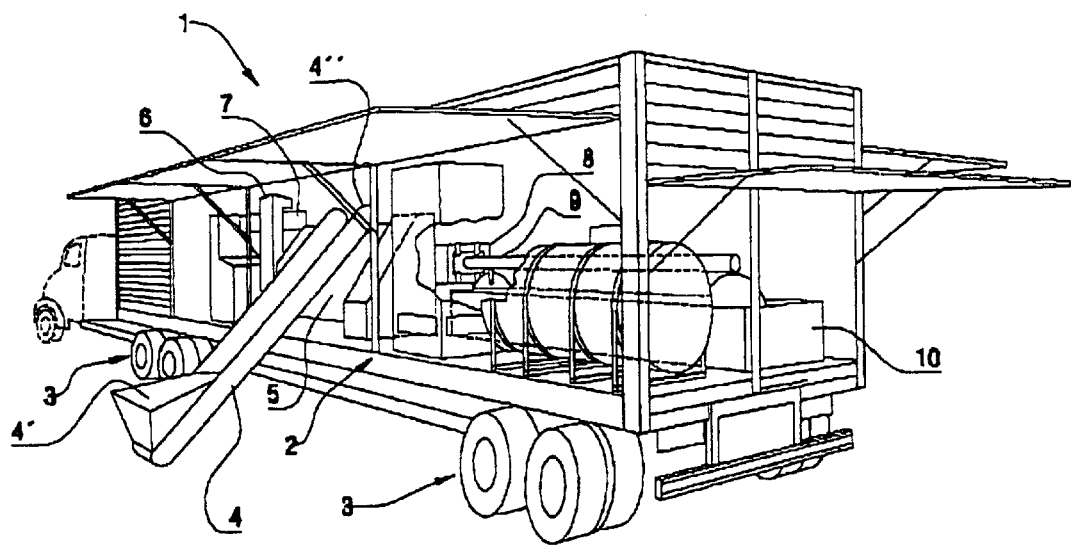
FIG. 2 is a perspective view of the purposed equipment that includes a trailer and the basic before mentioned elements.
Figure 3:
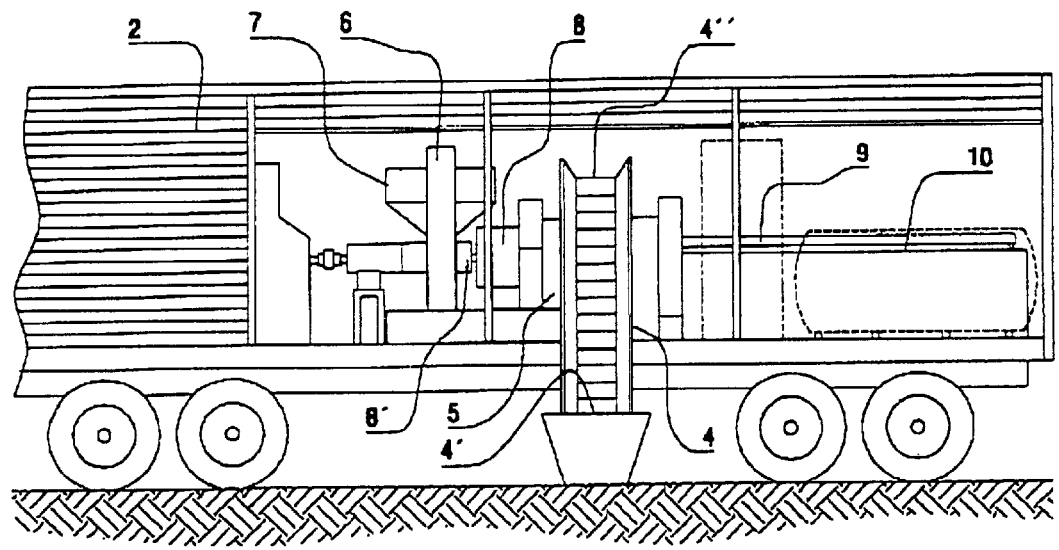
FIG. 3 is a lateral elevation view that shows the equipment from the belt conveyor including the mill, the chain dump and the extruder.
Figure 4:
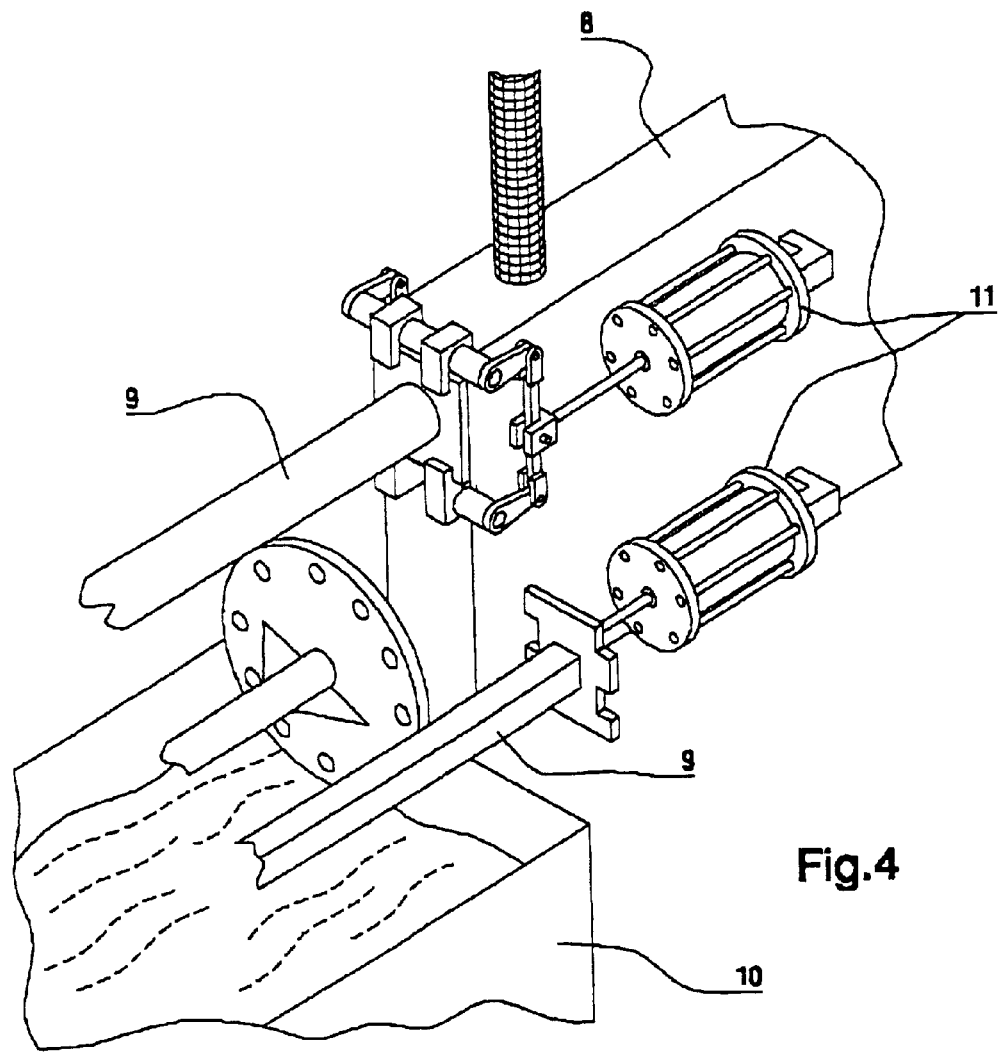
FIG. 4 is a perspective detailed view of the extruder tip and the molds; finally.
Figure 5:
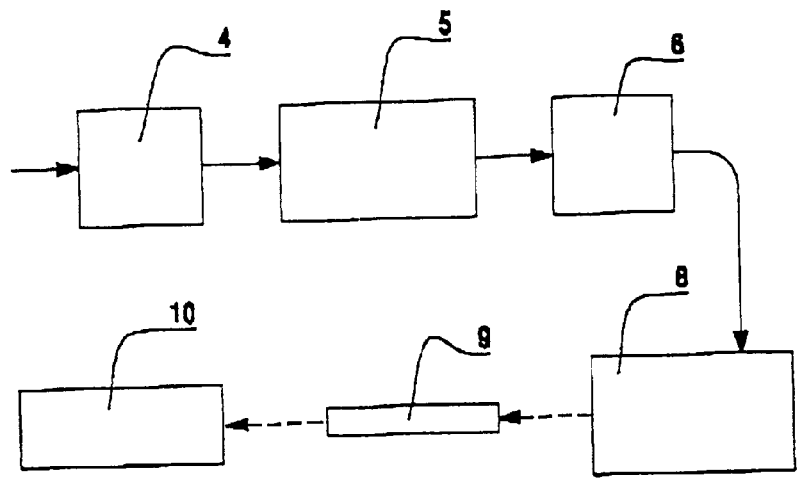
FIG. 5 is a block diagram that schematically shows the process involved in the manufacture of industrial pieces from the use of the proposed recycling equipment.

We will firstly make reference to FIG. 1. Several industrial products manufactured in accordance with the guidelines purposed by the present invention are shown, for example: a rod, a sewer, an agglomerated wood-type board.

In fact, it is possible to emphasize that the above mentioned products should not be interpreted in a limitative way since many other articles can be made, without limitation, by means of a mold, and in agreement with the proposed technological innovation.

Referring now to FIGS. 2–5, the recycling equipment indicated with general reference 1 includes a chassis 2 which is mounted in a pair of axes with wheels 3 and is useful to be hooked in a truck and to be taken to the place where it must make the operation in an independent form. As it is clearly seen in FIG. 2, a belt conveyor 4 is mounted in whose inlet mouth 4' the materials to be recycled are fed. More particularly plastic packages and bottles found in the rubbish dumps where the proposed equipment is going to be worked. This conveyor belt elevates the materials and by its end 4' they fall within a mill 5 which is the one in charge to grind these plastics until taking them to a controlled granulometry (depending on the type of material to be processed).

Once coming out of this mill, the buckets of a chain dump 6 overturn the worn out material given by mill 5 within the hopper 7 whose outlet mouth 7' ends at inlet mouth 8' of a screw extruder 8.

As usual, this extruder has heating means (not illustrated) for raising the temperature of the extruder internal camera until 300° C. The extruder's screw forward the mass of worn out materials causes two simultaneous effects: kneading and melting this plastic materials in a semi fluid state.

Once coming out the extruder, semi fluid material falls within a mold 9 in charge of receiving and moulding said semi fluid material. This mold is then submerged soon in a water tray 10 to cause the cooling and solidification of the plastic semi fluid material thus introduced in the mold. Once the mold cools off, the piece is taken off the mold using a pneumatic cylinder 11.

It is obvious that the final form of the product thus obtained will depend on the form of the mold that is used, but as it was previously specified posts, tables, rods and the like may be manufactured by using the proposed process for recycling sweeping materials, basically urban sweeping materials that generate a great contamination.

One of the most important features and novel characteristics of the purposed equipment resides on its autonomy since it does not require the provision of energy from the outside nor water. To reach that goal the equipment includes two Diesel engines, for moving the extruder's screw and the mill, as well as a fuel tank that feeds them and a water tank for the cooling trays.

It is also another important feature of the invention that the proposed equipment may be moved until the place where the sweeping materials are obtained, thus avoiding the manipulation of sweepings materials usually involving a great cost. This is particularly important taking into account that great amounts of sweeping materials are required to be able to select the necessary plastic-based materials for the purposed process.

In addition the plastic sweeping materials are not reclassified neither are washed nor prepared, but are used as obtained from the rubbish dump. They may be mixed with polyethylene and polypropylene as any other plastic substance. Also small amounts of other materials can be added, for example metals, without altering the product since they are melted in the same physical procedure of overheating the extruder camera.

In addition this process does not use any type of additional product and products of relative uniform grey colour are obtained with certain pigmentations of other tonalities that have infinity of industrial uses based on the mold that is preselected.

Once finished the product it is so solid that can be worked as wood and it has applications in several fields of the industry and construction. The obtained rods or products can be turned, hammered, nailed, painted, etc. and it is possible to be worked with the same machines used for wood works. Considering that the raw material used for manufacturing the purposed product is trash, it is important to point out that the finished product is absolutely sterilized due to the submission of the raw material to extremely high temperatures. Finally it is possible to emphasize that the equipment counts on an own electricity-generating group that electrically feeds the circuit of the equipment.

Finally, an illustrative and non-limitative embodiment of the present invention is detailed below, describing a qualitative-quantitative way for processing selected and classified materials obtained from urban sweeping materials in accordance with the guidelines of the present invention.

EXAMPLE 1

20 Kg. of sweeping materials were processed from trash raw material containing 10 Kg. of polyetilene, 3,2 Kg. of PET-type materials and the remaining as a mix including PVC and polyamide. Said processing step was carried out by a continuous extrusion in a conventional screw extruder at a temperature kept at a range of 198° C.–205° C. able to keep the mass viscosity sufficiently low to obtain a suitable extrusion flow. At the end of the extruder the semi fluid material is poured in molds for obtaining 19,22 kg of melted product consolidated in blocks.

EXAMPLE 2

500 Kg. of classified and selected sweeping material from urban trash previously washed, drained and worn out and finally homogenized were processed comprising: 40% of PET-type plastic material, 5% of cardboard, 20% of polycarbonates, 15% of polypropylene and 20% de polystyrene. This mix was processed and extruded as described above in Example 1 obtaining rods of 5; 1,0 and 2,0 cm of diameter.

In a similar operation, homogeneously colored rods were obtained, including in the mass ferric oxide as a dust incorporated in the meted mass during the extrusion process.

What is claimed is:

1. A process for manufacturing articles by separating recycling materials obtained from waste, including:
    providing a first component containing plastic polyethylene and polypropylene materials in a proportion ranging from between about 25% and 30% by weight of the final weight of the articles;
    providing a second component essentially constituted of plastic PET materials ranging from between about 30% and 40% by weight of the total weight of the articles;
    providing a third component selected from the group of materials consisting of PVC, styrene, polyamides, polycarbonates, polystyrene, ABS, aluminum and cardboard;
    whereby the combination of said first, second and third components forms 100% of the total weight of the articles; comprising the steps of:
        crushing the combined first, second and third components;
        milling and thereafter heating and extruding the milled the combined components at a temperature of about 300° C. so as to form a molten composite therefrom;
        pouring said molten composite into a mold;
        cooling said molten composite in said mold so as to form solidified said articles;
        and removing said articles from said mold.
2. A process according to claim 1, wherein the crushing step is implemented in a blades mill.
3. A process according to claim 1, wherein the mold is configured to selectively form articles in the shape of posts, tables, rods, braces, molding, cords, roadside ditches, boards and plates.

* * * * *